United States Patent
Phadtare et al.

(10) Patent No.: US 11,223,225 B2
(45) Date of Patent: Jan. 11, 2022

(54) INTELLIGENT STARTING AND CHARGING SYSTEM AND METHOD

(71) Applicant: DEERE & COMPANY, Moline, IL (US)

(72) Inventors: Amol Phadtare, Pune (IN); Terry Davisson, Dubuque, IA (US); Sean P. West, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 228 days.

(21) Appl. No.: 16/564,484

(22) Filed: Sep. 9, 2019

(65) Prior Publication Data

US 2021/0075245 A1    Mar. 11, 2021

(51) Int. Cl.
H02J 7/14       (2006.01)
H02J 7/00       (2006.01)
(Continued)

(52) U.S. Cl.
CPC ........ *H02J 7/1461* (2013.01); *F02N 11/0825* (2013.01); *F02N 11/0837* (2013.01); *F02N 11/0848* (2013.01); *F02N 11/0862* (2013.01); *H02J 7/0021* (2013.01); *B60W 2050/0075* (2013.01); *B60W 2050/046* (2013.01); *B60W 2050/048* (2013.01); *B60W 2556/45* (2020.02); *B60W 2556/65* (2020.02);
(Continued)

(58) Field of Classification Search
None
See application file for complete search history.

(56) References Cited

U.S. PATENT DOCUMENTS

| 5,469,043 A | 11/1995 | Cherng et al. |
| 5,714,946 A | 2/1998 | Gottshall et al. |

(Continued)

FOREIGN PATENT DOCUMENTS

| DE | 19806135 A1 | 8/1999 |
| DE | 10341838 A1 | 4/2005 |

(Continued)

OTHER PUBLICATIONS

German Search Report issued in counterpart application No. 102020208977.9 dated Mar. 11, 2021 (12 pages).

*Primary Examiner* — Kevin R Steckbauer
(74) *Attorney, Agent, or Firm* — Taft Stettinius & Hollister LLP; Stephen F. Rost

(57) ABSTRACT

A battery starting and charging system that monitors battery and other sensor readings; tracks vehicle state, determines a charging voltage based on battery temperature and vehicle state; sets the alternator to charge the battery with the charging voltage; determines current collected parameters based on the battery and other sensor readings; and makes vehicle start predictions based on the current collected parameters. The system can also determine whether the vehicle actually started; add the current collected parameters to a set of start events if it started, and to a set of no-start events if it didn't start. The start prediction can also be based on the sets of start and no-start events for one or multiple vehicles. The collected parameters and start predictions can also be based on collected weather data. The system can use a local interconnect network (LIN) alternator with a LIN network.

17 Claims, 5 Drawing Sheets

(51) Int. Cl.
*F02N 11/08* (2006.01)
*B60W 50/04* (2006.01)
*B60W 50/00* (2006.01)

(52) U.S. Cl.
CPC .. *F02N 2200/023* (2013.01); *F02N 2200/046* (2013.01); *F02N 2200/061* (2013.01); *F02N 2200/063* (2013.01); *F02N 2200/064* (2013.01); *F02N 2200/121* (2013.01); *F02N 2200/122* (2013.01); *F02N 2200/125* (2013.01); *F02N 2300/2006* (2013.01); *F02N 2300/306* (2013.01)

(56) References Cited

U.S. PATENT DOCUMENTS

| | | | | |
|---|---|---|---|---|
| 6,331,762 | B1* | 12/2001 | Bertness | H02J 7/163 |
| | | | | 320/134 |
| 7,528,570 | B2* | 5/2009 | Schiller | F02N 11/0862 |
| | | | | 320/104 |
| 7,743,649 | B1* | 6/2010 | Salman | F02N 11/0862 |
| | | | | 73/114.59 |
| 7,928,735 | B2 | 4/2011 | Huang et al. | |
| 8,770,165 | B2* | 7/2014 | Mizuno | F02N 11/0825 |
| | | | | 123/179.4 |
| 8,789,507 | B2 | 7/2014 | Doub | |
| 9,340,202 | B2* | 5/2016 | Books | B60W 20/40 |
| 9,455,657 | B2 | 9/2016 | Ito | |
| 10,037,634 | B2 | 7/2018 | Christofferson et al. | |
| 10,150,479 | B2* | 12/2018 | Fabregas | F02N 11/00 |
| 10,570,872 | B2* | 2/2020 | Miller | B60K 6/46 |
| 10,816,607 | B2* | 10/2020 | Karner | G01R 31/367 |
| 2010/0154524 | A1* | 6/2010 | Salman | F02N 11/0862 |
| | | | | 73/114.59 |
| 2010/0191446 | A1* | 7/2010 | McDonald | F02N 11/0837 |
| | | | | 701/113 |
| 2010/0269776 | A1* | 10/2010 | Mizuno | F02N 11/0825 |
| | | | | 123/179.4 |
| 2011/0050249 | A1* | 3/2011 | Maeda | G01R 31/364 |
| | | | | 324/649 |
| 2015/0252770 | A1* | 9/2015 | Books | B60W 30/192 |
| | | | | 701/22 |
| 2016/0266213 | A1 | 9/2016 | Kim | |
| 2017/0080919 | A1* | 3/2017 | Follen | F02N 11/0837 |
| 2018/0065636 | A1* | 3/2018 | Fabregas | F02N 11/0818 |
| 2019/0033397 | A1* | 1/2019 | Karner | H01M 10/48 |
| 2019/0249639 | A1* | 8/2019 | Miller | B60H 1/08 |
| 2019/0329756 | A1* | 10/2019 | Isac | B60W 10/26 |
| 2020/0309080 | A1* | 10/2020 | Chen | F02N 11/0825 |

FOREIGN PATENT DOCUMENTS

| | | |
|---|---|---|
| DE | 102007005241 A1 | 8/2008 |
| DE | 112009001806 T5 | 6/2011 |
| DE | 102016116035 A1 | 3/2017 |
| DE | 102019106167 A1 | 9/2019 |
| DE | 102019205663 A1 | 11/2019 |
| EP | 2640960 B1 | 1/2017 |
| WO | WO-2009083747 A1 * 7/2009 | ............ H02J 7/1423 |

* cited by examiner

INTELLIGENT STARTING AND CHARGING SYSTEM AND METHOD

FIELD OF THE DISCLOSURE

The present disclosure relates to electrical systems, and more particularly to a starting and charging system for a vehicle.

BACKGROUND

More and more technological features are being added to vehicles, and each of the features can have power requirements whether the vehicle is running or not, for example a central locking system, anti-theft device, and various vehicle sensors. Due to the increasing number of these power requiring features, vehicles can have substantial power consumption, even when shut off. This increases the risk that a vehicle may not be able to start after a prolonged shut-off. Therefore, it would be desirable to have a system that predicts the starting ability of the vehicle.

The starting ability of a vehicle is typically correlated to the vehicle's battery being able to provide the necessary starting power without falling short of some open circuit voltage. A vehicle alternator can be controlled to charge the battery so it is able to provide the necessary starting power. It may also be desirable for the system to intelligently control the alternator for charging the battery. Having the alternator maintain the battery at a higher state of charge can help prevent gassing and de-sulfate the battery plates for longer battery life.

SUMMARY

A battery starting and charging method is disclosed for multiple vehicles, where each of the vehicles includes a battery and an alternator. The battery starting and charging method includes the following steps for each vehicle, monitoring battery sensor readings from a battery sensor including a battery temperature; monitoring vehicle sensor readings of other vehicle sensors; tracking vehicle state; determining a battery charging voltage for the alternator of the vehicle based on the battery temperature and the vehicle state; setting the alternator of the vehicle to charge the battery with the determined battery charging voltage; determining current collected parameters for the vehicle based on the battery sensor and vehicle sensor readings for the vehicle; making a vehicle start prediction for the vehicle based on the current collected parameters; and communicating the vehicle start prediction to a user.

The battery starting and charging method can also include the following steps for each individual vehicle during a start attempt of the individual vehicle: determining whether the individual vehicle actually started; if the individual vehicle started, adding the current collected parameters to a set of start events for all the vehicles; and if the individual vehicle did not start, adding the current collected parameters to a set of no-start events for all the vehicles; and wherein making a vehicle start prediction for the individual vehicle is further based on the set of start events and the set of no-start events for all the vehicles. The battery starting and charging method can also include monitoring weather data; and determining current collected parameters for each vehicle can also be based on the weather data relevant to that vehicle. Making the vehicle start prediction can include comparing the current collected parameters for the individual vehicle to the set of start events for all the vehicles; comparing the current collected parameters for the individual vehicle to the set of no-start events for all the vehicles; if the current collected parameters for the individual vehicle are a better match to the set of start events than to the set of no-start events for all the vehicles, predicting that the individual vehicle will start; and if the current collected parameters for the individual vehicle are a better match to the set of no-start events than to the set of start events for all the vehicles, predicting that the individual vehicle will not start. Communicating the vehicle start prediction to a user can include sending the vehicle start prediction to a user device.

A battery starting and charging method is disclosed for a vehicle with a battery and an alternator. The battery starting and charging method includes monitoring battery sensor readings from a battery sensor which monitors parameters of the battery including a battery temperature; monitoring vehicle sensor readings of other vehicle sensors; tracking vehicle state of the vehicle; determining a battery charging voltage for the alternator based on the battery temperature and the vehicle state; setting the alternator to charge the battery with the determined battery charging voltage; determining current collected parameters based on the battery sensor readings and the vehicle sensor readings; and making a vehicle start prediction based on the current collected parameters. The battery starting and charging method can also include communicating the vehicle start prediction to a user by sending the vehicle start prediction to a user device.

The battery starting and charging method can also include determining whether the vehicle actually started; if the vehicle started, adding the current collected parameters to a set of start events; and if the vehicle did not start, adding the current collected parameters to a set of no-start events. Making a vehicle start prediction can also be based on the set of start events and the set of no-start events.

The battery starting and charging method can also include monitoring weather data. Determining current collected parameters can also be based on the weather data, and making the vehicle start prediction can also be based on the weather data.

The alternator can be a local interconnect network (LIN) alternator, monitoring battery sensor readings can be done over a LIN network, and setting the alternator can include sending a command to the alternator over the LIN network to charge the battery with the determined battery charging voltage.

The battery sensor readings can include a state of charge of the battery, a state of health of the battery, and an open circuit voltage for the battery. The vehicle sensor readings can include engine type, engine horsepower and engine coolant temperature.

Making a vehicle start prediction can include comparing the current collected parameters to the set of start events; comparing the current collected parameters to the set of no-start events; if the current collected parameters are a better match to the set of start events than to the set of no-start events, predicting that the vehicle will start; and if the current collected parameters are a better match to the set of no-start events than to the set of start events, predicting that the vehicle will not start.

Determining a battery charging voltage can include determining a voltage versus temperature compensation relationship for the battery; and determining the battery charging voltage as the battery charging voltage associated with the battery temperature according to the voltage versus temperature compensation relationship.

A battery starting and charging system for a vehicle is disclosed that includes a battery sensor, an alternator, other vehicle sensors, a charging system, and a starting system. The battery sensor monitors parameters of a battery and provides battery sensor readings including a battery temperature. The alternator supplies a charging voltage to the battery. The other vehicle sensors provide vehicle sensor readings. The charging system determines a vehicle state of the vehicle based on the battery sensor readings and the vehicle sensor readings, determines the charging voltage for the alternator based on the battery temperature and the vehicle state, and commands the alternator to charge the battery with the determined charging voltage. The starting system determines current collected parameters based on the battery sensor readings and the vehicle sensor readings, and makes a vehicle start prediction based on the current collected parameters. The battery starting and charging system can include a controller, where the controller includes the charging system and the starting system.

The battery starting and charging system can also include a set of start events when the vehicle started and a set of no-start events when the vehicle did not start, where each of the start and no-start events includes collected parameters associated with the respective start and no-start event. The starting system can also determine whether the vehicle actually started, add the current collected parameters to the set of start events when the vehicle does start, and add the current collected parameters to a set of no-start events when the vehicle does not start. The vehicle start prediction can also be based on the set of start events and the set of no-start events.

The battery starting and charging system can also include a network connection that provides weather data; and the starting system can determine the current collected parameters and make the vehicle start prediction also based on the weather data. The alternator can be a local interconnect network (LIN) alternator, and a LIN network can connect the LIN alternator, the battery sensor and the controller. The battery starting and charging system can also include a controller area network (CAN) that connects the controller, the battery sensor, the alternator, the other vehicle sensors, and the network connection.

The battery starting and charging system can determine a voltage versus temperature compensation relationship for the battery, and determine the charging voltage for the alternator as the battery charging voltage associated with the battery temperature according to the voltage versus temperature compensation relationship.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views. The corresponding parts do not need to be interchangeable, but merely perform similar functionality for the purposes described herein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

An intelligent starting and charging system can use a methodology for alternator charging and battery starting. The starting and charging system can use a local interconnect network (LIN) based alternator control, and an Intelligent battery sensor that continuously communicates with the alternator. The battery sensor can determine the state of charge and the state of health of the battery for a given period of time. The battery can be charged by the alternator at a desired potential for the given battery temperature and machine state. The necessary data can be gathered in real-time and provided to the starting and charging system. The starting and charging system can predict if the vehicle will start based on various parameters, which can include battery temperature, engine type, open circuit voltage, coolant temperature, etc.

Figure 1:
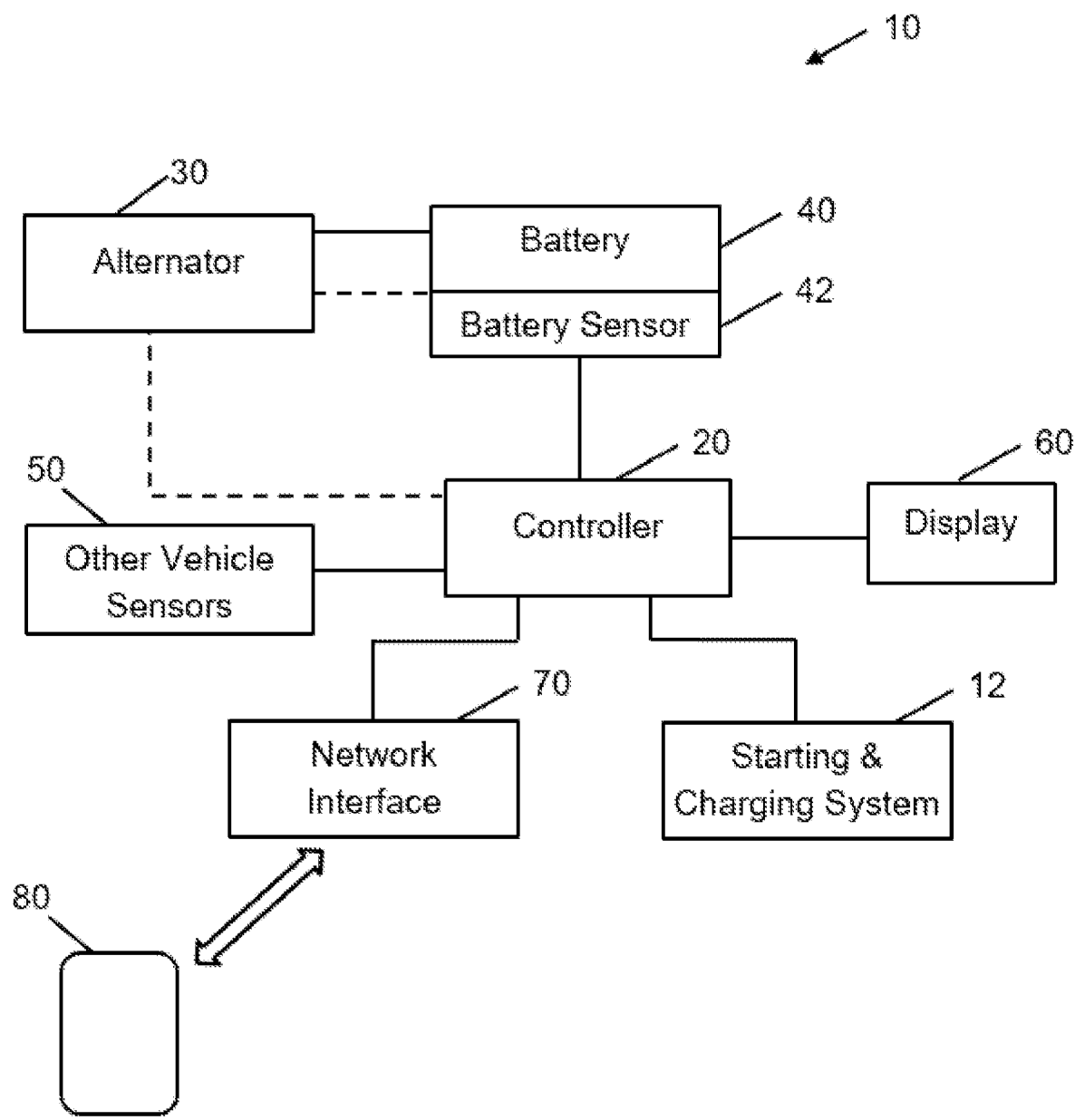
FIG. 1 illustrates an exemplary embodiment of a vehicle system that includes an intelligent starting and charging system with a vehicle controller, an alternator, a battery, a battery sensor and other vehicle sensors.

FIG. 1 illustrates an exemplary embodiment of a vehicle system 10 that includes an intelligent starting and charging system 12 coupled to a vehicle controller 20, an alternator 30, a battery 40, a battery sensor 42, other vehicle sensors 50 and a network interface 70. The vehicle controller 20, the alternator 30 and the battery 40 can be connected on a local interconnect network (LIN) bus (shown by dashed line) that uses alternator control for battery charging voltage and communicating diagnostics. The controller 20 can be coupled to the starting and charging system 12, the battery sensor 42 and the other vehicle sensors 50 over a controller area network (CAN) bus (shown by solid lines). The controller 20 can also be connected to a display 60 for communication with a vehicle operator or user, and can also be connected to the network interface 70 to receive additional data for system processing and send information. The network interface 70 can communicate over one or more network types, including for example wireless local area networks (e.g., WiFi, Bluetooth, etc.) and wireless wide area networks (e.g., cellular, satellite, etc.). The starting and charging system 12 can send messages and notifications to a user device 80 through the network interface 70. The user device 80 can include, for example, a computer, a tablet, a smartphone, etc. In the exemplary vehicle system 10, the intelligent starting and charging system 12 can be local to or reside on the vehicle.

Figure 2:
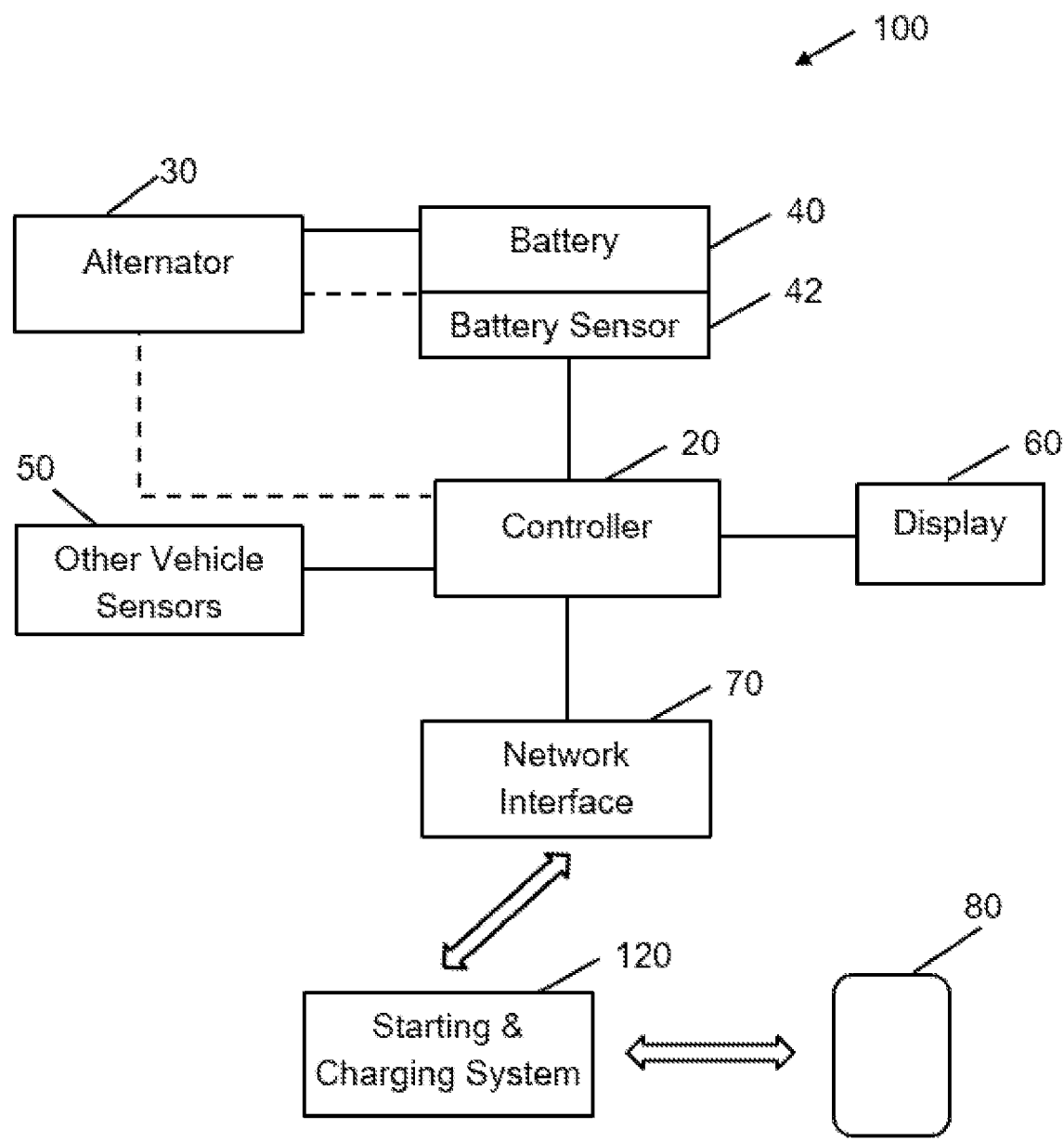
FIG. 2 illustrates an alternative embodiment of a vehicle system that includes an intelligent starting and charging system with a vehicle controller, an alternator, a battery, a battery sensor and other vehicle sensors.

FIG. 2 illustrates an alternative embodiment of a vehicle system 100 that includes an intelligent starting and charging system 120 coupled to the vehicle controller 20, the alternator 30, the battery 40, the battery sensor 42, the other vehicle sensors 50 and the network interface 70. The corresponding components of the vehicle system embodiments 10 and 100 can be different, but perform similar functions in the each embodiment. The vehicle controller 20, alternator 30 and battery 40 of the vehicle system 100 can be connected on a local interconnect network (LIN) bus (shown by dashed line) that uses alternator control for battery charging voltage and communicating diagnostics. The controller 20 can be coupled to the battery sensor 42, the other vehicle sensors 50, the display 60 and the network interface 70 over a controller area network (CAN) bus (shown by solid lines). The network interface 70 can communicate over one or more network types. The starting and charging system 120 can communicate with the vehicle controller 20 and the other components of the vehicle system 100 through the network interface 70. The starting and charging system 120 can also send messages and notifications to the user device 80. In the exemplary vehicle system 100, the intelligent starting and charging system 120 can be remote from the vehicle, including for example on a remote computer or server, or alternatively on the user device 80. The starting and charging system 120 can communicate with multiple vehicles to collect data, and then use the intelligence gathered over the entire vehicle population for charging and start prediction of each vehicle. The vehicle population in communication with the starting and charging system 120 can be local or widely dispersed, for example international.

Alternative embodiments of the intelligent starting and charging system can be hybrids or variations of the starting and charging systems 12 and 120 with portions local to the vehicle and portions remote from the vehicle. For example, charging portions can be local and start notification portions can be remote. The description below will be directed to the exemplary vehicle system 100 with the intelligent starting and charging system 120, but is also applicable to the exemplary vehicle system 100 with the intelligent starting and charging system 120, as well as other embodiments of vehicle systems with intelligent starting and charging systems.

Figure 3:
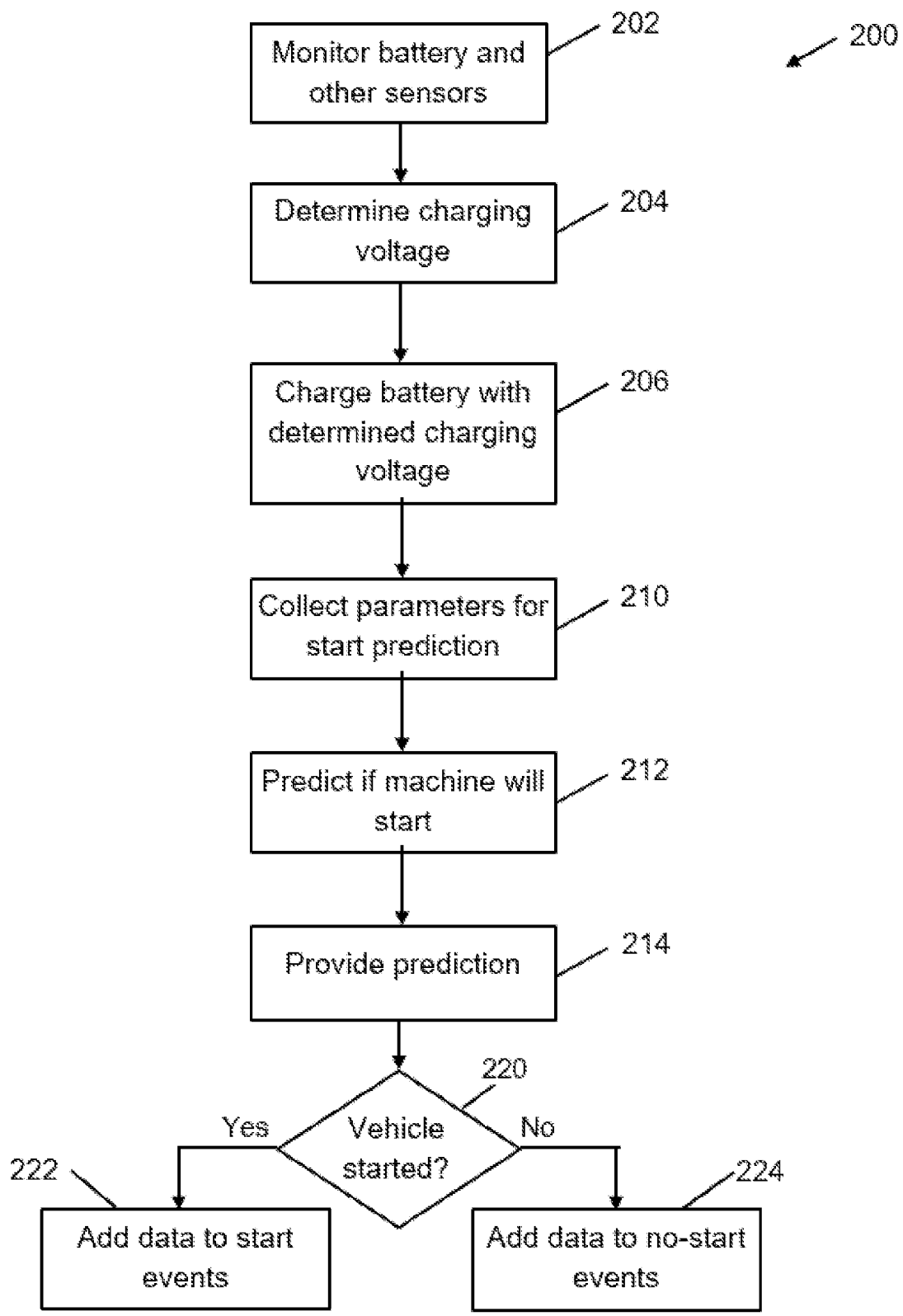
FIG. 3 illustrates an exemplary flow diagram for a starting and charging system that controls alternator charging and battery starting.

FIG. 3 illustrates an exemplary flow diagram 200 for the starting and charging systems 12, 120. The starting and charging system 120, in or through the controller 20, can control alternator charging and battery starting. At block 202, the system monitors the readings of the battery sensor 42 and the other vehicle sensors 50. The readings from the battery sensor 42 and the other vehicle sensors 50 can be collected into data packs and sent over machine telematics system to the starting and charging system 120. The battery sensor 42 can monitor the state of charge, state of health, temperature and other parameters of the battery 40. The controller 20 can track the machine state, for example possible states can include but are not limited to engine stop conditions, engine running conditions, transport laden, transport unladen, stationary semi-laden, stopped and loading, stationary dumping, stationary and laden, stationary and unladen, stopped and undergoing exhaust after-treatment cleaning, etc.

At block 204, for a given temperature of the battery 40 and machine state, the starting and charging system 120 determines a charging voltage for the alternator 30 to use for charging the battery 40. At block 206, the starting and charging system 120 communicates the determined charging voltage to the alternator 30, and the alternator 30 charges the battery 40 with the charging voltage determined at block 204.

At block 210, the starting and charging system 120 collects sensor data and determines parameters for an engine start prediction. This can be part of or in addition to the sensor monitoring done at block 202, and can include additional data provided through the network interface 70 or over other networks connected to the starting and charging system 120. The sensor data from the battery sensor 42 and the other vehicle sensors 50 can be gathered in real-time and provided to the starting and charging system 12. The data collected over the network interface 70 and/or other networks can include ambient temperature and humidity as well as weather forecast information giving future temperature, humidity and other weather and atmospheric conditions. The parameters collected can include charge, open circuit voltage and current for the battery 40, as well as fuel level, engine coolant temperature, engine type, engine horsepower, etc. At block 212, the starting and charging system 120 can predict if the vehicle will start based on the various parameters monitored or collected from the vehicle system 100 and other sources, which can include a population of vehicles of the same and other types. At block 214, the starting and charging system 120 can provide the start prediction to a user through the user device 80. For example, the starting and charging system 120 can send an email, text message or other notification to the user device 80. The starting and charging system 120 can also display the start prediction on the display 60. The notification of start prediction can be sent several hours, for example 8 hours, before the machine needs to be running on the job site using weather predictions and trending of vehicle data. This can enable a user to take remedial measures before the machine needs to be running, or to arrive at the machine with equipment to start the machine, for example a spare battery or jumper cables.

At block 220, the starting and charging system 120 can receive actual vehicle start information. If the machine started, control goes to block 222 where the current collected parameters for the machine that started can be added as a start event. If the machine did not start, control goes to block 224 where the current collected parameters for the machine that did not start can be added as a no-start event. A secondary battery not used for engine starting can be used to power sending of a no start event to the starting and charging system 120.

Figure 4:
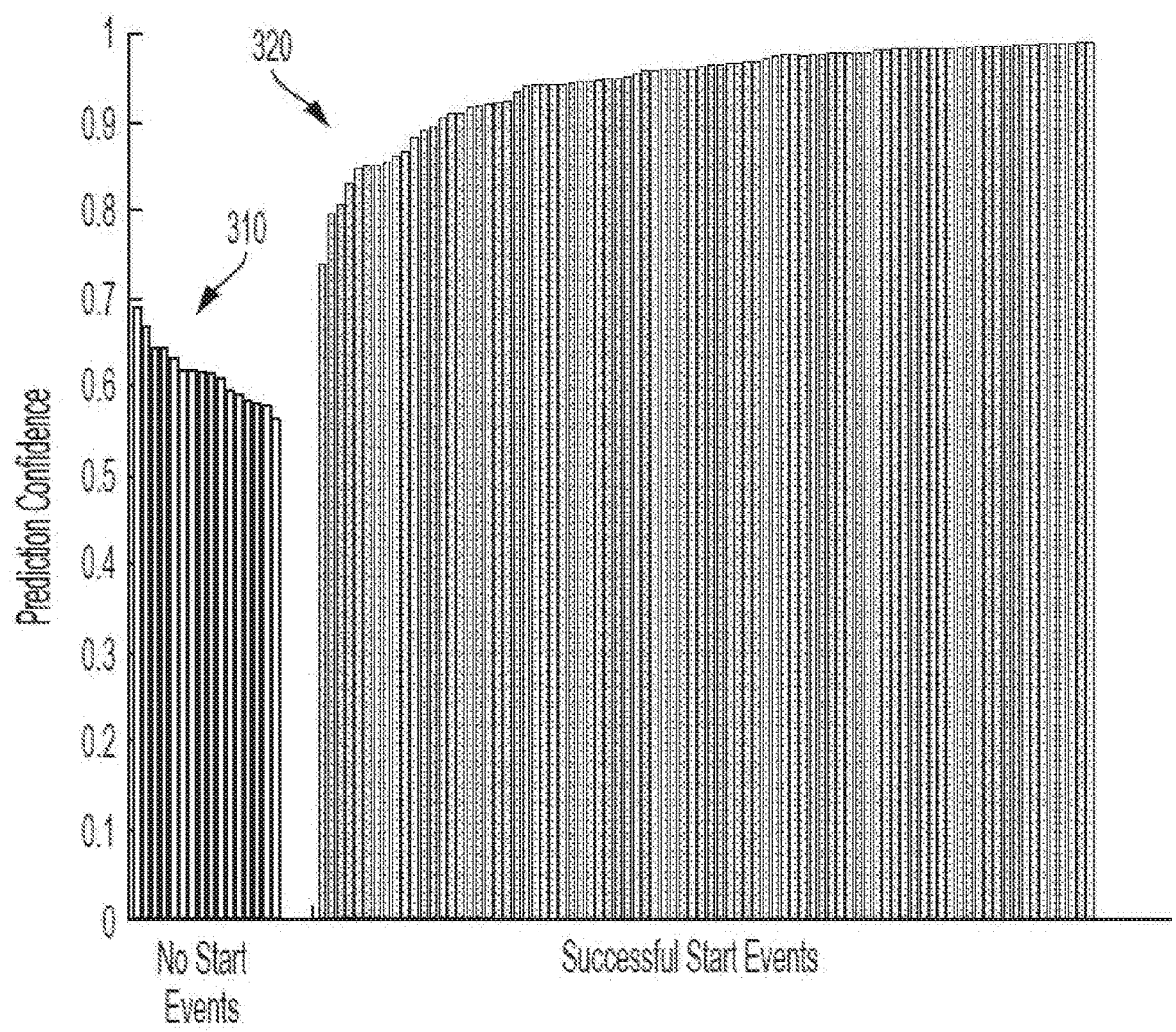
FIG. 4 illustrates data collected during multiple previous vehicle start attempts and groups them into no start events when the vehicle did not start, and successful start attempts when the vehicle did start.

The starting and charging system 120 can generate an engine start/no-start prediction based on current and previously collected data from one or more machines. The system 120 can collect current machine information from the battery sensor 42 and the LIN based alternator 30, along with other machine data from the other vehicle sensors 50, and weather and other data for the machine. Then this current information can be analyzed and processed to extract parameters. The collected data and extracted parameters, collectively collected parameters, can be compared to previous collected parameters for this and other machines to generate a start prediction which can be communicated to a user. For example, FIG. 4 illustrates data collected during a previous number of vehicle start attempts of one or more vehicles. Each vertical line indicates a start attempt. No start events 310 when the vehicle did not start are indicated by the group of lines on the left. Successful start attempts 320 when the vehicle did start are indicated by the group of lines on the right. The starting and charging system 120 determines commonalities and correlations of the collected parameters for the no start events 310, commonalities and correlations of the collected parameters for the successful start attempts 320, and distinguishing combinations and correlations of the collected parameters between the no start events 310 and successful start attempts 320. The starting and charging system 120 can do this for an individual vehicle using information for that vehicle, or can do this for a population of vehicles using information for all vehicles or similar vehicles in the population. When a new prediction is to be made at block 212 for a particular vehicle, the starting and charging system 120 can compare the current collected parameters with the commonalities of the collected parameters for the no start events 310, commonalities of the collected parameters for the successful start attempts 320, and distinguishing combinations of the collected parameters between the no start events 310 and successful start attempts 320 to determine whether the current collected parameters best fit with the prior no start events 310 or the prior successful start events 320. If the current collected parameters best fit with the prior no start events 310, then a no start prediction can be made. If the current collected parameters best fit with the prior successful start events 320, then a successful start prediction can be made.

Figure 5:
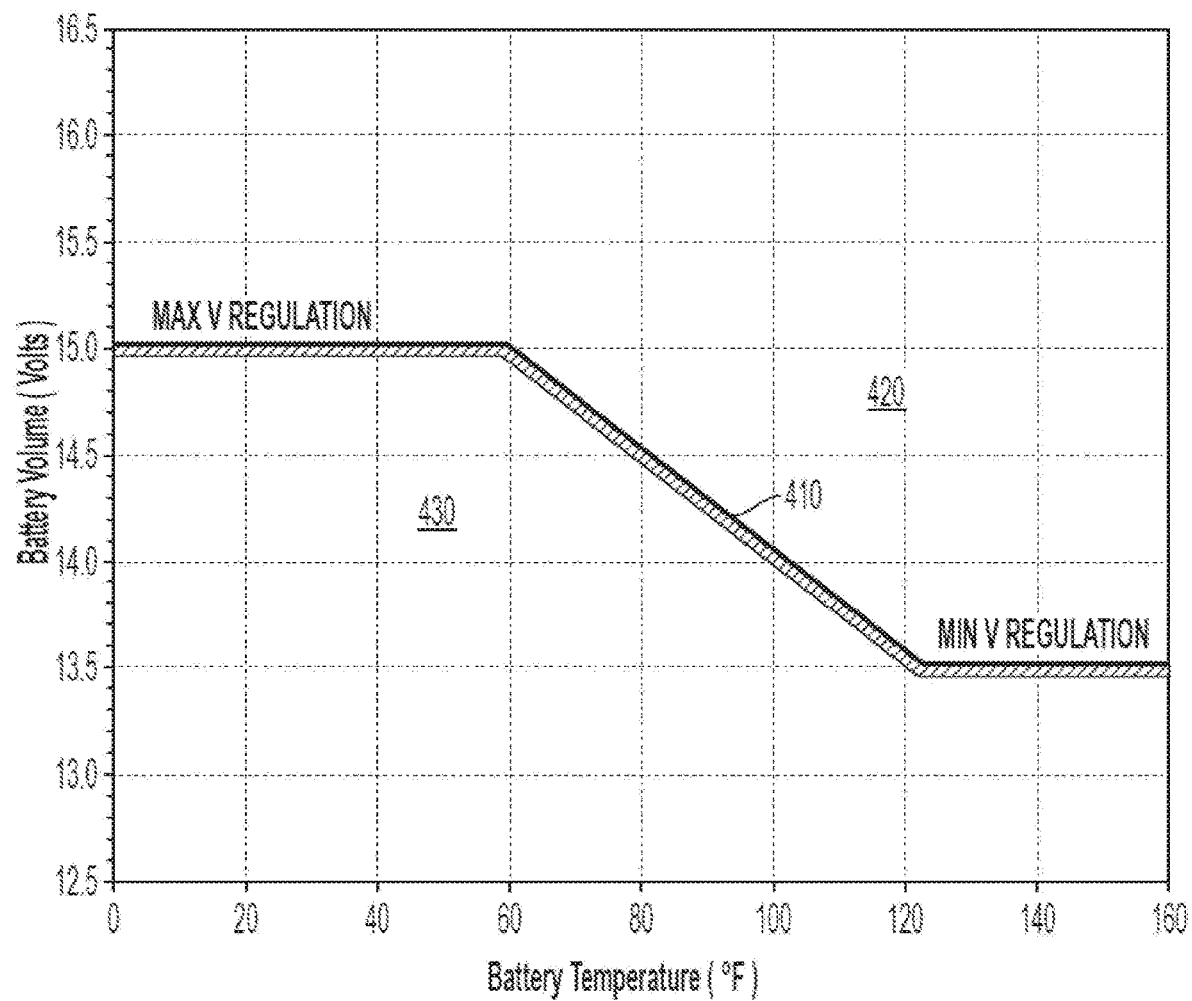
FIG. 5 illustrates an exemplary voltage versus temperature compensation curve that separates a gassing zone and a no gassing zone for a battery.

The starting and charging system 120 can also enable smart battery charging by enabling the vehicle to control the output voltage from the alternator 30 based on vehicle operating conditions to reduce electrical load and in turn mechanical load on the engine by the alternator 30. The LIN alternator 30 can maintain the battery 40 at a higher state of charge, maintain a voltage based on battery temperature to prevent gassing, can de-sulfate plates of the battery 40 for longer life, and can communicate diagnostics in case of any fault or failure. FIG. 5 illustrates an exemplary voltage versus temperature compensation curve 410 for a battery. Above and to the right of the compensation curve 410 indicates a gassing zone 420 where the battery is expected to outgas. Below and to the left of the compensation curve 410 indicates a no gassing zone 430 where the battery is not expected to outgas. A high battery state of charge can reduce sulfate build up on the battery plates but can cause outgassing. A low battery state of charge can increase sulfate build up on the battery plates but avoid outgassing. The starting and charging system 120 can try to keep the battery voltage on or close to the compensation curve 410 to reduce sulfate build up on the battery plates while avoiding outgassing.

The intelligent starting and charging system 120 can improve productivity by providing greater vehicle uptime, and can provide a temporary engine power boost (for example, about ~2 kW). The LIN alternator 30 can get vehicle load information over the LIN network so that it can automatically decouple with the engine. When the LIN alternator 30 decouples with the engine, the mechanical load on the engine is reduced which gives the engine a power boost. The intelligent starting and charging system 120 can increase starting power by maintaining a higher battery state of charge, and can enable alternator shut-off during start. There are some scenarios where a fault occurs in the alternator (for example, a battery short, a bad voltage regulator, thermal runaway, etc.) and in such scenarios, the alternator can be shut-off from the battery. The intelligent starting and charging system 120 can also increase battery life by reducing sulfate build up on the battery plates and avoiding outgassing, can improve diagnostics, can lower daily operating costs, and/or provide more energy efficient charging. System communication between a LIN based battery sensor 42 and a LIN based smart alternator 30 can improve diagnostics. Through diagnostics capabilities of the battery 40, battery sensor 42 and alternator 30, many of the starting and charging system problems can be resolved before major failure occurs in the system, which can help reduce problem resolution cycle times.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A battery starting and charging method for a plurality of vehicles, where each of the plurality of vehicles includes a battery and an alternator; the battery starting and charging method comprising for each individual vehicle of the plurality of vehicles:
   monitoring battery sensor readings from a battery sensor which monitors parameters of the battery of the individual vehicle including a battery temperature;
   monitoring vehicle sensor readings of other vehicle sensors which monitor other parameters of the individual vehicle;
   tracking vehicle state of the individual vehicle;
   determining a battery charging voltage for the alternator of the individual vehicle based on the battery temperature and the vehicle state for the individual vehicle;
   setting the alternator of the individual vehicle to charge the battery with the determined battery charging voltage for the individual vehicle;
   determining current collected parameters for the individual vehicle based on the battery sensor readings and the vehicle sensor readings for the individual vehicle;
   making a vehicle start prediction for the individual vehicle based on the current collected parameters;
   communicating the vehicle start prediction to a user; and
   for each individual vehicle of the plurality of vehicles during a start attempt of the individual vehicle:
      determining whether the individual vehicle actually started;
      if the individual vehicle started, adding the current collected parameters to a set of start events for the plurality of vehicles; and
      if the individual vehicle did not start, adding the current collected parameters to a set of no-start events for the plurality of vehicles;
   wherein making a vehicle start prediction for the individual vehicle is further based on the set of start events for the plurality of vehicles and the set of no-start events for the plurality of vehicles.

2. The battery starting and charging method of claim 1, further comprising:
   monitoring weather data;
   wherein determining current collected parameters for the individual vehicle is further based on the weather data relevant to the individual vehicle.

3. The battery starting and charging method of claim 2, wherein making the vehicle start prediction comprises:
   comparing the current collected parameters for the individual vehicle to the set of start events for the plurality of vehicles;
   comparing the current collected parameters for the individual vehicle to the set of no-start events for the plurality of vehicles;

if the current collected parameters for the individual vehicle are a better match to the set of start events for the plurality of vehicles than to the set of no-start events for the plurality of vehicles, predicting that the individual vehicle will start; and if the current collected parameters for the individual vehicle are a better match to the set of no-start events for the plurality of vehicles than to the set of start events for the plurality of vehicles, predicting that the individual vehicle will not start.

4. The battery starting and charging method of claim 3, wherein communicating the vehicle start prediction to a user comprises:

sending the vehicle start prediction to a user device.

5. A battery starting and charging method for a vehicle with a battery and an alternator, the battery starting and charging method comprising:

monitoring battery sensor readings from a battery sensor which monitors parameters of the battery including a battery temperature;

monitoring vehicle sensor readings of other vehicle sensors;

tracking vehicle state of the vehicle;

determining a battery charging voltage for the alternator based on the battery temperature and the vehicle state;

setting the alternator to charge the battery with the determined battery charging voltage;

determining current collected parameters based on the battery sensor readings and the vehicle sensor readings;

making a vehicle start prediction based on the current collected parameters;

communicating the vehicle start prediction to a user;

determining whether the vehicle actually started;

if the vehicle started, adding the current collected parameters to a set of start events; and if the vehicle did not start, adding the current collected parameters to a set of no-start events;

wherein making a vehicle start prediction for the vehicle is further based on the set of start events and the set of no-start events.

6. The battery starting and charging method of claim 5, further comprising:

monitoring weather data;

wherein determining collected parameters is further based on the weather data;

wherein making the vehicle start prediction is further based on the weather data.

7. The battery starting and charging method of claim 6, wherein the alternator is a local interconnect network (LIN) alternator, and:

wherein monitoring battery sensor readings comprises monitoring the battery sensor readings from the battery sensor over a LIN network; and wherein setting the alternator comprises sending a command to the alternator over the LIN network to charge the battery with the determined battery charging voltage.

8. The battery starting and charging method of claim 7, wherein communicating the vehicle start prediction to a user comprises:

sending the vehicle start prediction to a user device.

9. The battery starting and charging method of claim 7, wherein making the vehicle start prediction for the monitored vehicle comprises:

comparing the current collected parameters to the set of start events;

comparing the current collected parameters to the set of no-start events;

if the current collected parameters are a better match to the set of start events than to the set of no-start events, predicting that the vehicle will start; and if the current collected parameters are a better match to the set of no-start events than to the set of start events, predicting that the vehicle will not start.

10. The battery starting and charging method of claim 9, wherein determining a battery charging voltage comprises:

determining a voltage versus temperature compensation relationship for the battery; and determining the battery charging voltage as the battery charging voltage associated with the battery temperature according to the voltage versus temperature compensation relationship.

11. The battery starting and charging method of claim 5, wherein determining a battery charging voltage comprises:

determining a voltage versus temperature compensation relationship for the battery; and determining the battery charging voltage as the battery charging voltage associated with the battery temperature according to the voltage versus temperature compensation relationship.

12. A battery starting and charging system for a vehicle, the battery starting and charging system comprising:

a battery sensor configured to monitor parameters of a battery and provide battery sensor readings including a battery temperature;

an alternator configured to supply a charging voltage to the battery;

other vehicle sensors configured to provide vehicle sensor readings;

an alternator controller configured to determine a vehicle state of the vehicle based on the battery sensor readings and the vehicle sensor readings, to determine the charging voltage for the alternator based on the battery temperature and the vehicle state, and to command the alternator to charge the battery with the determined charging voltage; and a start prediction module configured to collect current collected parameters based on the battery sensor readings and the vehicle sensor readings, to maintain a set of prior start events when the vehicle started and a set of prior no-start events when the vehicle did not start, and to predict a vehicle start prediction based on the current collected parameters, and the set of prior start events and the set of prior no-start events;

wherein each prior start event of the set of prior start events includes the collected parameters associated with that prior start event, and each prior no-start event of the set of prior no-start events includes the collected parameters associated with that prior no-start event; and wherein the start prediction module is further configured to monitor whether the vehicle actually started, and to add the current collected parameters as a new start event to the set of prior start events when the vehicle does start, and to add the current collected parameters as a new no-start event to the set of no-start events when the vehicle does not start.

13. The battery starting and charging system of claim 12, further comprising:

a network connection that provides weather data; and wherein the start prediction module is configured to include the weather data in the current collected parameters, and to predict the vehicle start prediction also based on the weather data.

14. The battery starting and charging system of claim 13, wherein the alternator controller includes the start prediction module.

15. The battery starting and charging system of claim 14, wherein the alternator is a local interconnect network (LIN) alternator, and the battery starting and charging system further comprises:
   a LIN network that connects the LIN alternator, the battery sensor and the alternator controller.

16. The battery starting and charging system of claim 15, further comprising a controller area network (CAN) that connects the alternator controller, the battery sensor, the alternator, the other vehicle sensors, and the network connection.

17. The battery starting and charging system of claim 16, wherein the alternator controller is configured to determine a voltage versus temperature compensation relationship for the battery, and to determine the charging voltage for the alternator as the battery charging voltage associated with the battery temperature according to the voltage versus temperature compensation relationship.

* * * * *